United States Patent Office 3,154,535
Patented Oct. 27, 1964

3,154,535
POLYETHYLENEOXY AZO FUGITIVE TINTS
Arthur D. Graham, Jr., Spartanburg, S.C., assignor to Deering Milliken Research Corporation, Spartanburg, S.C., a corporation of Delaware
No Drawing. Filed Jan. 30, 1962, Ser. No. 169,962
1 Claim. (Cl. 260—198)

This invention relates to novel blue tints having substantially complete fugitivity for substantially all textile fibers.

The novel tints of this invention have the formula

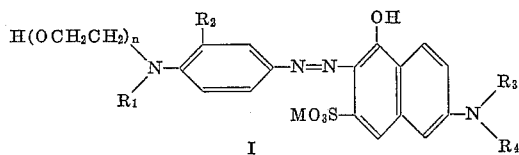

wherein $n$ is an integer between about 15 and 500; $R_1$ is $H(OCH_2CH_2)_n$—, $n$ having the value given above, aryl, alkyl, alkaryl or aralkyl; $R_2$ is hydrogen, alkyl, aryl, alkaryl, aralkyl or alkoxy; $R_3$ and $R_4$ are hydrogen, alkyl, aryl, alkaryl or aralkyl; and M is alkali-metal.

In the above compounds, when $R_1$ is $H(OCH_2CH_2)_n$— $n$ is preferably between about 25 and 100 and more preferably between about 35 and 75; at least one of $R_2$, $R_3$ and $R_4$ are hydrogen; and aryl, alkyl alkaryl, aralkyl and alkoxy preferably contain from one to twelve carbon atoms, and preferably are hydrocarbon, e.g., phenyl, naphthyl, methyl, ethyl, propyl, tolyl, mesityl, benzyl, phenethyl, etc., any substituents thereon being of a non-functional and non-reactive nature which will not interfere in the reactions described below for preparing such compounds. When $R_1$ is other than $H(OCH_2CH_2)_n$—, $n$ is preferably twice the above values.

These tints have a blue color, generally with a reddish cast, have good light-fastness and are very fugitive with respect to all textile fibers, according to the standards set forth by the industry for fugitive tints useful for temporarily identifying fibers, yarns or fabrics.

It is difficult to obtain blue universally fugitive tints having the polyethyleneoxy structure and, surprisingly, those that are obtained generally have extremely limited light-fastness, thus limiting their commercial utility as fugitive tints. Compounds having the above structure have substantial superiority to polyethyleneoxy blue fugitive tints in general with respect to light-fastness.

The compounds of this invention are prepared by the following series of reactions.

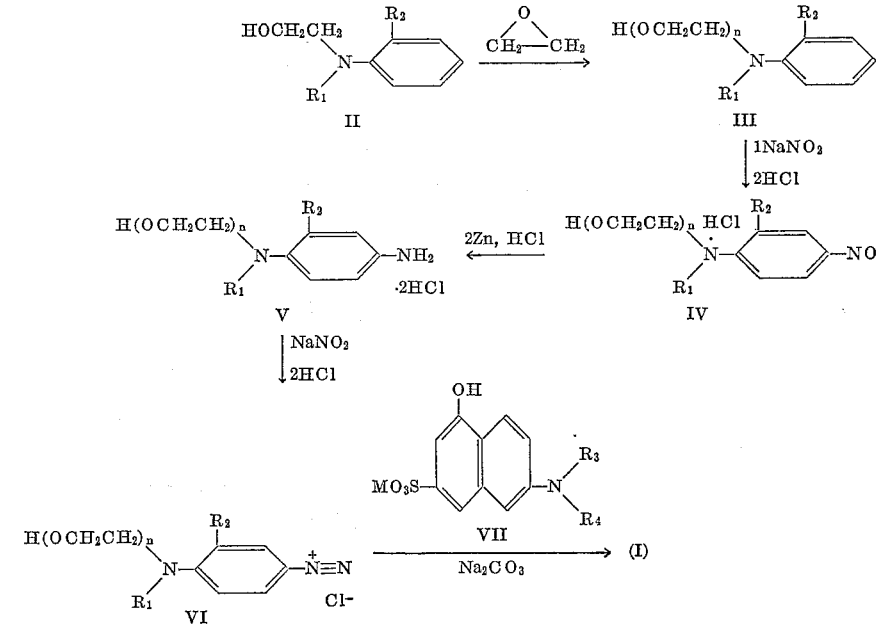

With the exception of Compound II, where $n$ is 1 when $R_1$ is $H(OCH_2CH_2)_n$, $R_1$, $R_2$, $R_3$, $R_4$, $n$ and M the values given above.

The following preparations and examples are illustrative of the compounds of this invention and methods for their preparation.

PREPARATION I

One mole (182 g.) of N,N-di-(hydroxyethyl)-aniline, (II; $R_1=HOCH_2CH_2$—, $R_2=H$) in a flask equipped with stirrer, thermometer and gas inlet tube near the bottom and a gas outlet tube near the top of the flask, is heated to 140° C. under nitrogen. About 200 mg. of sodium is added as catalyst. Ethylene oxide is bubbled into the molten, vigorously stirred material at a rate such that a slight amount of gas escapes from the outlet tube. The ethylene oxide addition is continued, with cooling to maintain the temperature between about 140–160° C., until about 98 moles (3,312 g.) of ethylene oxide has reacted, thus producing N,N-(dihydroxyethylpolyethyleneoxy)-aniline containing a total of about 100 ethyleneoxy groups.

PREPARATION II

About 1 mole (4,500 g.) of N,N-di(hydroxyethylpolyethyleneoxy)-aniline obtained according to the procedure of Preparation I (III; $R_1=H(OCH_2CH_2)_n$, $n=50$, $R_2=H$) is dissolved in a mixture of 4 liters of water and 2.14 moles (206.6 g.) of 37.8% hydrochloric acid. The mixture is cooled to 0–5° C. and with stirring a solution of 1.07 moles (74 g.) of sodium nitrite in 250 ml. of water is added over a 30 minute period, maintaining the mixture at that temperature and continuing the stirring for an additional 30 minutes when the addition is complete. There is thus-produced the p-nitroso derivative of the starting compound, which compound should immediately thereafter be reduced to the more stable p-amino derivative.

PREPARATION III

To the cool solution obtained according to Preparation II, containing the N,N-di(hydroxyethylpolyethyleneoxy)-p-nitroso-aniline (IV; $R_1=H(OCH_2CH_2)_n-$, $n=50$, $R_2=H$), is added 7 moles (676 g.) of 37.8% hydrochloric acid with stirring followed by 3.5 moles (225 g.) of zinc dust. One-half of the latter is added over a thirty minute period followed, fifteen minutes later, by the remaining half over an additional thirty minute period. Stirring is continued until the characteristic yellow compound of the nitroso compound disappears, keeping the temperature at all times below 20° C. The excess zinc is removed by filtration leaving a clear solution containing the hydrochloric acid salt of N,N-di(hydroxyethylpolyethyleneoxy)-phenylenediamine.

PREPARATION IV

To the solution obtained according to the procedure of Preparation III containing the hydrochloric acid salt of N,N-di(hydroxyethylpolyethyleneoxy)-phenylenediamine (V; $R_1=H(OCH_2CH_2)_n$, $n=50$, $R_2=H$), is added 193 grams of 37.8% hydrochloric acid and the mixture is cooled to 0° C. With vigorous stirring and cooling to maintain the temperature below about 5° C., a solution of 1.01 mole (70 g.) of sodium nitrite in 280 ml. of water is quickly added. After 30 minutes, the excess nitrous acid is destroyed with sulfamic acid to provide a negative starch-iodide test. The solution is then carefully brought to a pH of 4 with dilute aqueous sodium carbonate, to provide the diazonium salt of N,N-di(hydroxyethylpolyethyleneoxy)-phenylenediamine (VI; $R_1=H(OC_2H_4)_n-$, $n=50$, $R_2=H$)

Following the procedure of Preparations I–IV, other compounds represented by Formula II, e.g., N,N-di(hydroxyethyl)-substituted o-toluidine, o-anisidine, o-diphenylamine, o-benzylaniline, o-tolylaniline, o-phenethylaniline and N-hydroxyethyl-substituted N-methylaniline, N-ethylaniline, N-phenylaniline, N-benzylaniline, N-tolylaniline, N-phenethylaniline, N-methyl-o-toluidine, N-methyl-o-anisidine, N-methyl-o-benzylaniline, and N-methyl-o-phenyl-aniline, are converted to the corresponding diazonium salts, i.e., compounds represented by Formula VI containing a total of about 100 polyethyleneoxy groups.

Similarly, the N,N-di(hydroxyethylpolyethyleneoxy) and N-hydroxyethylpolyethyleneoxy diazonium compounds represented by Formula VI and containing a total of about 15, 30, 50, 75, 100, 250 or 500 ethyleneoxy groups, and otherwise corresponding to the above-named compounds are prepared from the corresponding N-hydroxyethyl compounds represented by Formula II by varying the amount of ethylene oxide reacted with the N-hydroxyethyl compound in the reaction described in Preparation I.

Examples

One mole, calculated on the basis of pure material, of 6-anilino-1-naphthol-3-sulfonic acid (phenyl J acid) is dissolved in 1 liter of water and the solution brought to neutrality with sodium carbonate. To this solution is then added 4.5 moles (477 g.) of sodium carbonate and 200 g. of ice. To this cold solution is slowly added with vigorous stirring the still cold solution of the diazonium salt of N,N-di(hydroxyethylpolyethyleneoxy)-phenylenediamine (VI, $R_1=H(OCH_2CH_2)_n$, $n=50$, $R_2=H$) obtained according to the procedure of Preparation IV. The reddish-blue tint is formed almost immediately. After one hour the mixture is filtered and neutralized with hydrochloric acid to a pH of 7. The tint is isolated by evaporation of the water at about 60° C. under vacuum, dissolving the tint in benzene, toluene or xylene, filtering salts which precipitate, and distilling the solvent. A melt of the purified tint is obtained which solidifies on cooling.

Following the procedure of the above-described reaction, each of the diazonium compounds named in the paragraph following Preparation IV containing a total of 100 ethyleneoxy groups react with 6-anilino-1-naphthol-3-sulfonic acid to produce the corresponding coupling reaction product, i.e., compounds represented by Formula I wherein $R_3$ is H, $R_4$ is phenyl and, in the first six of the above described compounds, $R_1$ is $H(OCH_2CH_2)_n-$, $n$ is about 50, and $R_2$ is methyl, methoxy, phenyl, benzyl, tolyl, and phenethyl, respectively, and in the remaining compounds $n$ is about 100, and $R_1$ and $R_2$ are methyl and H, ethyl and H, phenyl and H, benzyl and H, tolyl and H, phenethyl and H, methyl and methyl, methyl and methoxy, methyl and benzyl, and methyl and phenyl, respectively.

Substituting other 6-amino substituted 1-naphthol-3-sulfonic acids, e.g., 6-amino-, 6-methylamino-, 6-ethylamino-, 6-benzylamino-, 6-tolylamino-, 6-phenethylamino-, 6-dimethylamino-, 6-methyl,ethylamino-, 6-methylanilino-, 6-methyl,benzylamino-, 6-methyl,phenethylamino-, 6-methyl,toluidino- and 6-diphenylamino-1-naphthol-3-sulfonic acid, in the above described coupling reaction with each of the above-named diazonium compounds produces the corresponding 6-amino-substituted-1-naphthol-3-sulfonic acid coupling reaction product (I).

Similarly, the N,N-di(hydroxyethylpolyethyleneoxy) and N-hydroxyethylpolyethyleneoxy compounds containing a total of about 15, 30, 50, 75, 100, 250 or 500 ethyleneoxy groups and otherwise corresponding to the above-named diazonium salts (VI) can be coupled with each of the above-described 6-amino-substituted-1-naphthol-3-sulfonic acids to produce other fugitive tints of this invention represented by Formula I.

I claim:

A compound of the formula

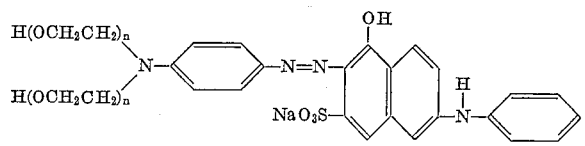

wherein $n$ is about 50.

References Cited in the file of this patent
UNITED STATES PATENTS
2,131,712  Schoeller et al. _____ Sept. 27, 1938